(12) United States Patent
Ankney

(10) Patent No.: US 10,041,560 B2
(45) Date of Patent: Aug. 7, 2018

(54) PISTON HEAD ASSEMBLY FOR RADIO CONTROLLED CARS SHOCK ABSORBER AND METHOD

(71) Applicant: Michael A Ankney, Cypress, TX (US)

(72) Inventor: Michael A Ankney, Cypress, TX (US)

( * ) Notice: Subject to any disclaimer, the term of this patent is extended or adjusted under 35 U.S.C. 154(b) by 0 days.

(21) Appl. No.: 15/596,454

(22) Filed: May 16, 2017

(65) Prior Publication Data

US 2017/0254380 A1    Sep. 7, 2017

Related U.S. Application Data

(63) Continuation-in-part of application No. 15/092,876, filed on Apr. 7, 2016, now Pat. No. 9,682,605, and a continuation-in-part of application No. 14/631,190, filed on Feb. 25, 2015, now abandoned.

(51) Int. Cl.
  *F16F 9/32* (2006.01)
  *F16F 9/36* (2006.01)

(52) U.S. Cl.
  CPC .......... *F16F 9/3214* (2013.01); *F16F 9/3271* (2013.01); *F16F 9/368* (2013.01); *B60Y 2200/81* (2013.01)

(58) Field of Classification Search
  CPC ........ F16F 9/3214; F16F 9/3271; F16F 9/368; B60Y 2200/81
  USPC ............................ 188/322.15, 322.13, 282.6
  See application file for complete search history.

(56) References Cited

U.S. PATENT DOCUMENTS

| | | | |
|---|---|---|---|
| 3,957,140 A * | 5/1976 | Overkott | F16F 9/3405 137/493.8 |
| 4,620,619 A | 11/1986 | Emura et al. | |
| 4,775,038 A | 10/1988 | Unnikrishnan et al. | |
| 4,809,828 A | 3/1989 | Nakazato | |
| 6,540,052 B2 | 4/2003 | Fenn et al. | |
| 6,802,408 B2 * | 10/2004 | Krammer | F16F 9/348 188/282.1 |
| 7,040,068 B2 | 5/2006 | Shinata | |
| 7,213,689 B2 | 5/2007 | Chang | |
| 7,310,876 B2 | 12/2007 | May et al. | |
| 8,083,039 B2 | 12/2011 | Vanbrabant | |
| 8,235,188 B2 | 8/2012 | Kais | |
| 8,517,153 B2 * | 8/2013 | Baltes | F16F 9/3485 188/282.6 |
| 9,682,605 B2 | 6/2017 | Ankney | |

(Continued)

*Primary Examiner* — Thomas J Williams
*Assistant Examiner* — Mariano Sy
(74) *Attorney, Agent, or Firm* — Kenneth L. Nash; Thomas D. Nash

(57) ABSTRACT

An apparatus and method for a piston head assembly for an R/C car shock absorber provides for differing flow rates through the piston depending on whether the piston is presently in rebound or compression movement. A piston head may be constructed with a plurality of separate recesses further having at least first and second one way valve holes and a plurality of two way valve holes surrounding the central recess. In one embodiment, two sealing members fit within two separate recesses whereby the sealing member keeps the first and second one way valve holes generally closed. When fluid flow contacts the sealing member during the rebound stroke, fluid flows through the first and second one way valve holes moves the seal member to the open position thereby providing more fluid flow and a quicker rebound damping response.

15 Claims, 3 Drawing Sheets

(56) References Cited

U.S. PATENT DOCUMENTS

| | | |
|---|---|---|
| 2013/0180813 A1 | 7/2013 | Moore, Jr. |
| 2013/0234378 A1 | 9/2013 | Ericksen et al. |
| 2016/0245359 A1 | 8/2016 | Ankney |

* cited by examiner

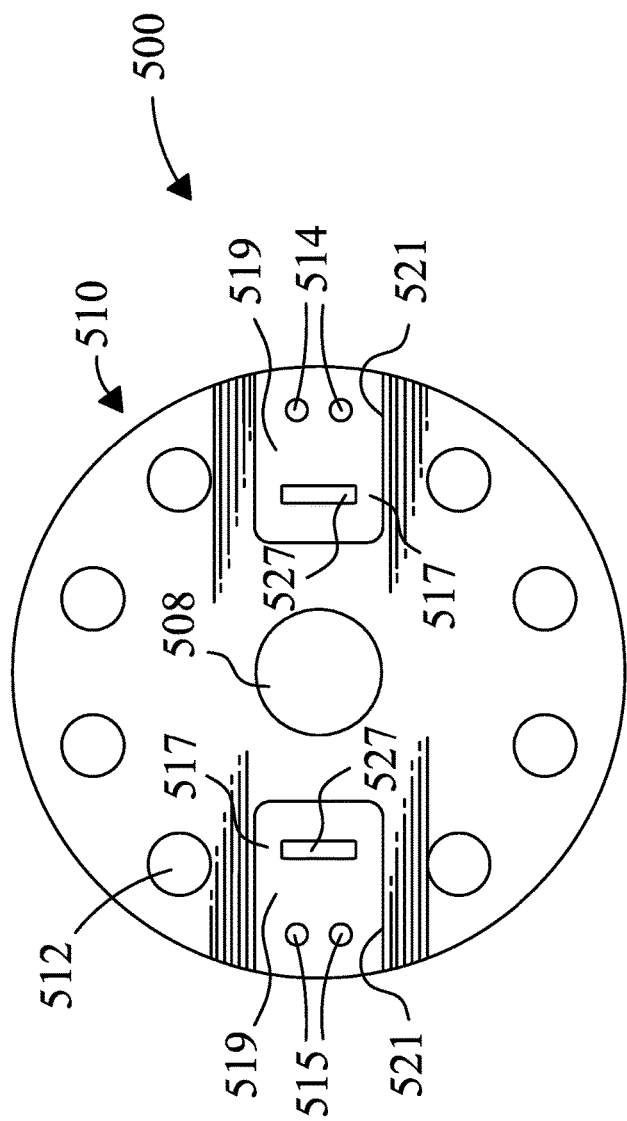
FIG. 5A
FIG. 5B

PISTON HEAD ASSEMBLY FOR RADIO CONTROLLED CARS SHOCK ABSORBER AND METHOD

BACKGROUND OF THE INVENTION

Field of the Invention

The present invention relates generally to shock absorbers and, more particularly in some non-limiting embodiments, to a piston head assembly for an R/C (Radio controlled) car shock absorber.

Background of the Invention

The sport of R/C vehicle racing is highly competitive. Professional drivers of R/C vehicles who race at the upper levels of the sport are well paid by sponsors. Engineers and hobbyists have worked for decades to constantly improve performance of R/C vehicles in every aspect of operation including motors, tires, weight, construction, shock absorbers, and the like. R/C vehicle enthusiasts are constantly searching for improved performance. Even small changes that can improve performance of lap speed by fractions of seconds are highly desirable and sought after. However, given the long term intense competition and efforts for improvements in this field, it is somewhat unusual to find improvements that reliably improve lap speed by one-half second or more. Devices that do provide performance improvements are often complex and inconsistent or prone to being less robust than desirable. Devices that provide improved performance in a manner that is readily repeatable and reliable are highly sought after.

Shock absorbers are commonly used in R/C vehicles and are commonly used in conjunction with springs in a variety of applications, particularly vehicles, bicycles, and the like, to control suspension movement by absorbing and dissipating energy during travel. Fluid-filled shock absorbers are one common type of shock absorber wherein a piston fastened to a piston rod travels through fluid in the bore of the piston cylinder. Another common type is similarly constructed, but with a gas instead of a fluid housed within the piston cylinder.

When a vehicle encounters a bump or uneven terrain, the suspension compresses during the compression stroke. After completing the compression stroke, the suspension responds by returning to its original position during the rebound stroke. Valves on the piston head restrict the flow of oil through the piston, causing more pressure to be created in front of the piston then behind it. The pressure differential creates the damping force needed to resist the uncontrolled movement of the piston and associated spring.

In the R/C car setting, shock absorbers provide a similar function but on a much smaller scale, which leads to unique problems specific to the R/C car application, including product materials, size difficulties, and the like. Tapered pistons and wafer pistons are just two of many alternatives that have been advanced to combat the problems outlined above. Examples of background patents and publications in the general area of shock absorbers include:

U.S. Pat. No. 4,620,619, issued Nov. 4, 1986, to Emura et al., discloses a variable-damping-force shock absorber such that the damping force determined through an orifice selected by an orifice adjuster according to the driver's preference can further automatically be increased during extension for improvement in road-holding ability and decreased during compression for improvement in riding comfort. The shock absorber according to the present invention comprises an annular member formed with an orifice and a disk valve disposed on top of the annular member. During extension, the disk valve is closed for allowing fluid to by-pass through an orifice of the annular member; during compression, the disk valve is opened for additionally allowing fluid to by-pass through the annular member. Further, since the various elements for adjusting the damping force are completely housed within the piston rod, it is possible to increase the stroke of the piston rod.

U.S. Pat. No. 4,775,038, issued Oct. 4, 1988 to Unnikrishnan et al., discloses a piston valving and seal mechanism for a fluid shock absorbing device. A piston is mountable on a piston rod of the device. The piston has an outer periphery, rebound chamber face and compression chamber face. A piston seal is movably mounted in a groove where the piston rebound chamber face and outer periphery meet. The seal is adjacent compression passages in the outer periphery. A seal retainer plate along the piston rebound chamber face with a backing spring bias the seal. The plate is raised from the rebound chamber face and includes passages through the plate for fluid flow through the plate and into underlying recoil passages in the piston. The seal acts as a check valve for the compression passages. A separate recoil passage valve plate on the compression chamber face, with a backing spring, acts as a valve for the recoil passages.

U.S. Pat. No. 4,809,828, issued Mar. 7, 1989 to Nakazato, discloses a one-way damping valve mechanism in a hydraulic damper having a first hydraulic chamber defined in a cylinder, and a piston rod having an inner end on which there is mounted a piston slidably fitted in the cylinder, divides the first hydraulic chamber into a second hydraulic chamber and a third hydraulic chamber. The valve mechanism produces a damping force when the piston is moved in a prescribed direction to move working oil from the second hydraulic chamber into the third hydraulic chamber. The valve mechanism comprises a subvalve for defining a first hydraulic passage to generate a damping force when the piston moves at an extremely low speed in the prescribed direction, and a main valve for defining a second hydraulic passage to generate a damping force when the piston moves in a medium/high speed range in the prescribed direction.

U.S. Pat. No. 6,540,052, issued Apr. 1, 2003 to Fenn et al., discloses a Damping-valve body, in particular for a piston-cylinder unit filled with damping fluid, having separate passages for two directions of flow, at least some of the passages having an outlet opening that is at least partially covered by at least one valve disk. Each passage has a rib that extends radially, relative to a first direction of flow of the damping fluid, from a boundary wall of the passage and bears a valve support surface for the at least one valve disk.

U.S. Pat. No. 7,040,468, issued May 9, 2006 to Shinata, discloses a hydraulic shock absorber includes a cylindrical housing within which a piston assembly is slidably received. The piston assembly includes a piston element connected to a piston rod and adapted to divide an interior of the housing into compression and rebound chambers. The piston element has compression and rebound passages to provide fluid communication between the compression and rebound chambers. A valve assembly includes a first valve disc positioned on a lower side of the piston element, and a second valve disc retained on the first valve disc. The second valve disc includes apertures arranged in a circumferentially spaced relationship and are selectively openable and closeable by the first valve disc. A third valve disc is retained on the second valve disc and has notches arranged in a circumferentially spaced relationship. The notches cooperate with the apertures to collectively form ports. The ports are communicated with the compression chamber. A fourth valve disc cooperates with the second valve disc to sandwich the third valve disc so that restrictive orifices are defined in an outer end of the notches. Each of the ports has a cross sectional area greater than that of the restrictive orifices regardless of a relative angular position between the second and third valve discs.

U.S. Pat. No. 7,213,689, issued May 8, 2007 to Chang, discloses a shock absorber for a remote-controlled model car includes a sealing member fixed on the topside of a piston. The sealing member has two opposite flexible portions respectively matching with the flow-guiding holes of the piston, with flow gaps formed between the flexible portions and the upper outer sides of the piston. The flow gap, matching with the extent of an external force imposed upon the shock absorber, can be properly diminished or closed up. Each flexible portion is bored with a flow-adjusting hole smaller than and aligned to the flow-guiding hole of the piston for reducing the flow amount of liquid oil flowing through the flow-guiding hole. When pressed by different-extent external forces, the shock absorber can automatically adjust its buffering force to an excellent condition by adjustment of the flow-adjusting holes and the flow gaps.

U.S. Pat. No. 7,310,876, issued Dec. 25, 2007 to May et al., discloses a method for producing a one-part piston body for a piston-cylinder arrangement, in particular a shock absorber piston, is disclosed. The method may include in a first step, pressing a green compact comprising a revolving web and longitudinal support webs from a sinterable metallurgical powder. In a second step, the green compact may be sintered to form a blank. In a third step, radially disposed stamping tools may be used to form, under material displacement, transverse grooves into at least a part of the support webs through cold deformation. In a fourth step, the blank provided with transverse grooves may be calibrated to its final form through pressing with calibrating tools.

U.S. Pat. No. 8,083,039, issued Dec. 27, 2011 to Vanbrabant, discloses a disc valve assembly for a shock absorber opens due to axial movement of a valve disc. The valve disc is biased against a valve body by a valve spring. The valve spring is designed to provide a circumferentially asymmetrical load biasing the valve disc against the valve body. The disc valve assembly can be used as a piston rebound valve assembly, a piston compression valve assembly, a base valve compression valve assembly or a base valve rebound valve assembly.

U.S. Pat. No. 8,235,188, issued Aug. 7, 2012 to Kais, discloses a damping element for a vibration damper that works with hydraulic fluid. The fundamental structure of the damping element includes a one-piece base body configured as a circular disk, which has a plurality of first flow-through openings, each having an entry cross-section in a first face side of the base body, as well as a plurality of second flow-through openings, each having an entry cross-section in an opposite, second face side of the base body, as well as circular valve disks on both face sides of the base body, which rest against a support surface of the base body, disposed in the center, and at least partially close off exit cross-sections of the flow-through openings. The exit cross-sections are surrounded by control edges, which form contact surfaces for the valve disks and project beyond the support surface as well as the entry cross-sections. The height of the control edges increases with an increasing radial distance from the center point of the base body in the form of a circular disk. According to the invention, the flow-through openings have a flow channel section that is preferably cylindrical and opens into a larger exit cross-section bordered by the control edges.

United States Patent Application No. 2013/0180813, published Jul. 18, 2013 to Moore, Jr., discloses a shock absorber configured to mount within a remote control vehicle. The shock absorber includes a cylindrical housing, a piston rod, and an acircular piston head. The piston head includes a plurality of substantially flat surfaces disposed on sides of the piston head that form bypass gaps between the piston head and the cylindrical housing. The acircular piston head includes a plurality of bypass apertures disposed through the piston head in an angularly asymmetrical configuration. The acircular piston head is generally octagon shaped. The acircular piston head includes a plurality of spaced arcuate edges sized to come in contact with an interior surface of the cylindrical housing. The shock absorber includes a plurality of bypass valves formed by cooperative operation of a shim coupled against the bypass apertures, such that fluid is permitted to flow through the bypass valves in a first direction and is restricted in a second direction.

United States Patent Application No. 2013/0180813, published Sep. 12, 2013 to Ericksen et al., discloses a vehicle damper comprising a fluid filled cylinder, a piston for movement within the cylinder, at least two fluid ports formed in the piston and at least one shim at least partially blocking the ports. In one embodiment, a fluid collection area is formed between the ports and the shim, the collection area permitting communication between fluid in the ports. In another embodiment, the piston includes at least one aperture constructed and arranged to receive a threaded bleed valve.

Many efforts have been made to improve the operation of all components of R/C vehicles including the relatively small size shock absorbers of R/C vehicles. Consequently, those skilled in the art will appreciate the present invention that addresses the above and other problems.

SUMMARY OF THE INVENTION

An object of the present invention is to provide an improved R/C shock absorber that improves racing lap times.

Another possible object of the present invention is to provide an improved piston head assembly for R/C shock absorbers that improves racing performance.

Another possible object is to provide an improved piston head assembly for R/C shock absorbers with an increased rebound damping force.

Yet another possible object of the present invention is to provide a reliable and simplified piston for R/C shock absorbers which provides for a quick rebound damping force to reliably improve lap times.

A further possible object of the present invention is to provide an improved piston head assembly for R/C absorbers without unintended consequences to drivability.

These and other objects, features, and advantages of the present invention will become clear from the figures and description given hereinafter. It is understood that the objects listed above are not all inclusive, are non-limiting, and are only intended to aid in understanding the present invention, and do not limit the bounds of the present invention in any way.

Accordingly, the present invention, in one possible non-limiting embodiment comprises a piston head assembly for an R/C shock absorber. The R/C shock absorber comprises a piston rod, a piston cylinder, and fluid within the piston cylinder.

The piston head assembly comprises a piston head with a round periphery and defines a plurality of two-way holes therein that permit two-way fluid flow through the piston head when the piston head reciprocates in the piston cylinder. The piston head further defines at least first and second one way fluid flow valve holes in the piston head and at least one key slot.

A sealing member comprises a central portion and at least first and second valve members extend radially outwardly from the central portion. At least one key may extend from the sealing member. The at least one key and the at least one key slot are relatively positioned for cooperation to orient the first valve member to engage the first valve hole and the second valve member to engage the second valve hole to thereby form first and second one-way valves in the piston head. In another embodiment the sealing member is secured within a recess in the piston head.

The first and second valve members are flexible to open and close the first and second one-way valves in response to reciprocating movement of the piston head in the cylinder. As well, the first and second valve members are sufficiently resilient to engage and close the first and second one-way valves when the piston head is not moving in the piston cylinder. Accordingly the materials for the valve members are chosen with these requirements.

In one embodiment, the at least one key member may comprise greater than ten percent of a volume of the sealing member. The piston head may define a recess therein, with the sealing member being sized to fit inside the recess. In one embodiment, the flexible sealing member fits entirely within the recess. In another embodiment, the at least one key slot is defined within a boundary of the recess and comprises a depth in the piston head greater than a depth of the recess.

In one embodiment, the piston head may define a centrally positioned hole for connection to the piston rod. In one embodiment, two key slots are utilized with each of the two key slots being curved around the centrally positioned hole by an arc angle greater than sixty degrees.

In another embodiment, the first and second one-way valve holes in the piston head comprise first and second groups of valve holes. The first valve member engages the first group of valve holes and the second valve member engages the second group of valve holes.

In yet another embodiment, a method for manufacturing a piston head assembly for an R/C shock absorber is disclosed. The method for manufacturing a piston head assembly includes, but is not limited to, providing a piston head with a round periphery and defining a plurality of two-way holes therein that permit two-way fluid flow through the piston head when the piston head reciprocates in the piston cylinder. The piston head further defines first and second valve holes (or more valve holes) in the piston head and comprises at least one key slot (or more). The method further comprises providing a sealing member comprising a central portion and first and second (or more) valve members extending radially outwardly from the central portion.

Other steps may include providing at least one key extending from the sealing member. Other steps including providing that when the key is positioned within the key slot then the first valve member is oriented to engage the first valve hole and the second valve member is oriented to engage the second valve hole to thereby form first and second one-way valves in the piston head. The first and second valve members are flexible to open and close the first and second one-way valves in response to reciprocating movement of the piston head in the cylinder.

Another step may include providing the at least first and second valve members are also sufficiently resilient to engage and close the first and second one-way valves when the piston head is not moving in the piston cylinder.

The method may comprise providing the piston head defines a recess therein, the sealing member being sized to fit inside the recess and further providing the flexible sealing member fits entirely within the recess.

Another step may include defining the at least one key slot within a boundary of the recess and providing the at least one key slot comprises a depth in the piston head greater than a depth of the recess.

The method may further comprise providing the piston head defines a centrally positioned hole for connection to the piston rod, the at least one key slot actually comprises two key slots and each of the two key slots are curved around the centrally positioned hole by an arc angle greater than sixty degrees.

A further step may include providing the at least first and second one-way valve holes in the piston head comprise first and second groups of valve holes. The first valve member engages the first group of valve holes and the second valve member engages the second group of valve holes.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings, wherein:

FIG. 5A is a top view of a piston head assembly for an R/C shock absorber in accord with one possible non-limiting embodiment of the present invention.

FIG. 5B is a top view of a flexible sealing member with an opening to receive a post on the piston head in one possible non-limiting embodiment of the present invention.

The above general description and the following detailed description are merely illustrative of the generic invention, and additional modes, advantages, and particulars of this invention will be readily suggested to those skilled in the art without departing from the spirit and scope of the invention.

DETAILED DESCRIPTION OF THE PREFERRED EMBODIMENT

Figure 1:
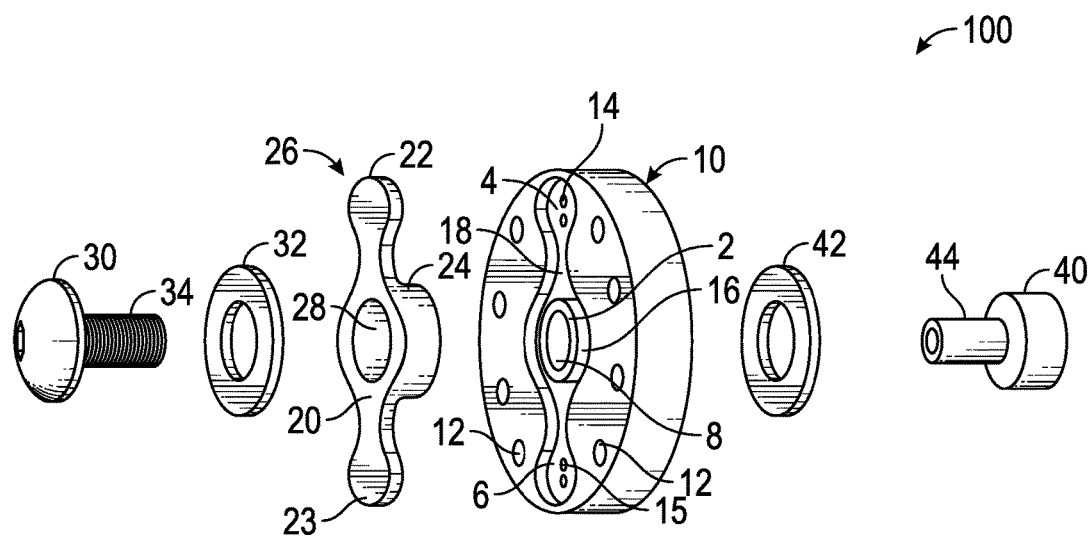
FIG. 1 is an exploded perspective view of a piston head assembly for an R/C shock absorber in accord with one possible non-limiting embodiment of the present invention.

Turning now to the drawings, and more particularly FIG. 1, there is depicted an exploded perspective view of piston head assembly 100 for an R/C shock absorber in accord with one possible non-limiting embodiment of the present invention. Generally speaking, piston head assembly 100 comprises sealing member 26 positioned on one side of piston head 10, with both sealing member 26 and piston head 10 attached to piston rod 40 by fastener 30. In this non-limiting embodiment, sealing member 26 is mounted on a side of piston head 10 opposite to piston rod 40. Bolt stem 34 is inserted through washer 32, sealing member hole 28, central aperture 8, and washer 42 before connecting with piston rod connection 44. Fastener 30 may comprise various fasteners suitable for connecting with rod 40, including, but not limited to screws, nuts, and the like. In this embodiment, washers 32 and 42 are placed between fastener 30 and sealing member 26, and piston head 10 and piston rod 40, respectively. In other embodiments, various alternative fastening arrangements may be utilized to secure piston head 10 to piston rod 40 consistent with the teachings of the present invention. In one embodiment, washer 32 is sized to cover a sufficient portion of sealing member 26 within recess 18 to prevent rotation of sealing member 26 within recess 18. Washer 32 is small enough to allow valve members 22 and 23 at the ends of sealing member 26 to have sufficient flexibility to open and close one-way valve holes 14 and 15.

In the present embodiment, piston or piston head 10 has a round periphery and comprises a plurality of two-way valve holes 12, as well as first one way valve holes 14 and second one way valve holes 15. Two-way valve holes 12 permit fluid flow in both directions through piston head 10. The one way valve holes may comprise a group of one way valve holes as shown in FIG. 1 where first one way valve holes 14 and second one-way valve holes 15 comprise two holes for each group. However, one hole or more than one hole could be utilized. The one-way valve holes may be smaller than the two-way valve holes if desired as perhaps best shown in FIG. 4. Piston head 10 will be discussed in further detail herein in regards to FIG. 4. Valve members 22 and 23 interact with one-way valve holes 14 and 15 to form one way valves. Valve members 22 and 23 are oriented by their position in recess 18 or by use of keys 24 to engage one-way valve holes 14 and 15.

In alternative embodiments, more one way valves may be provided consistent with this disclosure to provide a desired rebound damping force. For example, additional valve members may extend from central body 20 of valve member 26. Preferably, the valve members extend in a symmetrical way so that the forces produced by operation of the one-way valves do not cause tilting of piston head 10 during operation. For example, with three one-way valves, the valve members may be spaced sixty degrees apart. If four one-way valves are used, the valve members may be spaced apart by ninety degrees.

In one embodiment, recess 18 is sized to receive sealing member 26. In one possible embodiment, recess 18 may but is not required to also comprise key slots 16. In one embodiment, recess 18 comprises first recessed portion 4 and second recessed portion 6. In a preferred embodiment, recess 18 has the same shape as sealing member 26 but is slightly larger to allow sealing member 26 to fit therein and to allow valve members 22 and 23 to cover and uncover holes 14 and 15.

First recessed portion 4 and second recessed portion 6 extend radially outward in opposite directions from central portion 2, and comprise one way valve holes 14 and 15. Key slots 16, the depth of which is shown better in FIG. 2 and FIG. 3, can surround central portion 2 and engage key 24 to prevent axial movement of sealing member 26 during operation. In this embodiment, recess 18 is the same depth at all places except for key slots 16. In another embodiment, key slots may not be utilized.

In an alternative embodiment, sealing member 26 could rest on the surface of piston head 10. In that embodiment, only key slots 16 would extend into the face of piston head 10 to receive keys 26, shown in FIG. 2 and FIG. 3, with the shape shown in FIG. 4. The keys and key slots may be of different shapes.

Sealing member 26 comprises central body 20 with sealing member aperture 28 and first valve member 22 and second valve member 23 extending outwardly from body 20 in opposite directions. In a preferred embodiment, first valve member 22 and second valve member 23 are elongated oval shaped appendages that extend outwardly from the central portion that surrounds sealing member hole 28. In other embodiments, different shapes are possible within the concepts described herein provided that first valve member 22 and second valve member 23 seat properly within first recessed portion 4 and second recessed portion 6. In one embodiment, two keys 24 extend perpendicularly with respect to first valve member 22 and second valve member 23 (or axially as does fastener 30) and are curved to surround central portion 2 while fitting with key slots 16 with the outline thereof shown in FIG. 4. Keys 24, when positioned in key slots 16, maintain the sealing member 26 in the correct orientation so that valve members 22 and 23 abut one-way valve holes 14 and 15.

It will be appreciated that significant forces are created during operation with the oil in the piston so that the size and shape of keys 24 and slots 16 being sufficiently large to keep the correct orientation of sealing member 26. In one embodiment, the axial length of keys 24 and corresponding depth of key slots may be approximately the same or greater than the thickness of valve members 22 and 23 as perhaps better shown in FIG. 2 and FIG. 3. Keys 24 may comprise a significant portion of the volume of sealing member 22. For example keys 24 may comprise greater than 10, 15, 20, or 30 percent of the volume of sealing member 22.

Keys 24 may be of different shape and construction. For example, keys 24 may extend radially outwardly from central body 20 like spokes or tabs and the corresponding key slots then may or may not be recessed more deeply than recess 18. Accordingly, keys 24 and key slots 16 may be of numerous different configurations to thereby orient the valve members correctly with respect to the one-way valve holes.

When keys 24 are utilized, then sealing member 26 may be molded. Without keys, sealing member 26 may be flat and may be stamped or cut out. Accordingly, sealing member 26 may be constructed in different ways.

In one embodiment as shown, first valve member 22 and second valve member 23 fit flush and/or fully contained within recess 18 including first recessed portion 4 and second recessed portion 6. First valve member 22 and second valve member 23 and are sufficiently resilient to engage one way valve holes 14 and 15 and close them off whereby first and second one way valve holes 14 and 15 are in the closed position preventing fluid flow when piston head 10 is not moving within piston cylinder 60. Accordingly in one embodiment as shown, two normally closed one-way valve members are created. The thickness and/or resilience of the valve member will affect the response time of the valve so that thicker, less resilient, less flexible material of valve member reduces the fluid flow through the one way valves.

In one embodiment, a dedicated washer such as washer 32 hold the valve 26 and sufficient portions of the extension or arcs adjacent the central portion in the recess. If desired, washer 32 may be larger to cover greater portions of the valve member 26 to reliably maintain valve 26 in the correct orientation. The valve 26 is shaped such that it fits in precise arcs or extensions from the central portion to locate and position or orient the valve correctly so that ends of valve members 22 and 23 engage and disengage holes 14 and 15. Past the arcs, the valves shape is relieved from the recess in the piston to facilitate free movement of the valve. The valves thickness is also a factor as to the depth of the recess and again, precise tolerances are held to keep the valve in place and provide free movement. We have also found that different durometer, flexibility, thickness, and resilience of valves yields different results and is considered a tuning option. (softer valve=more oil flow, harder valve=less oil flow).

Figure 2:
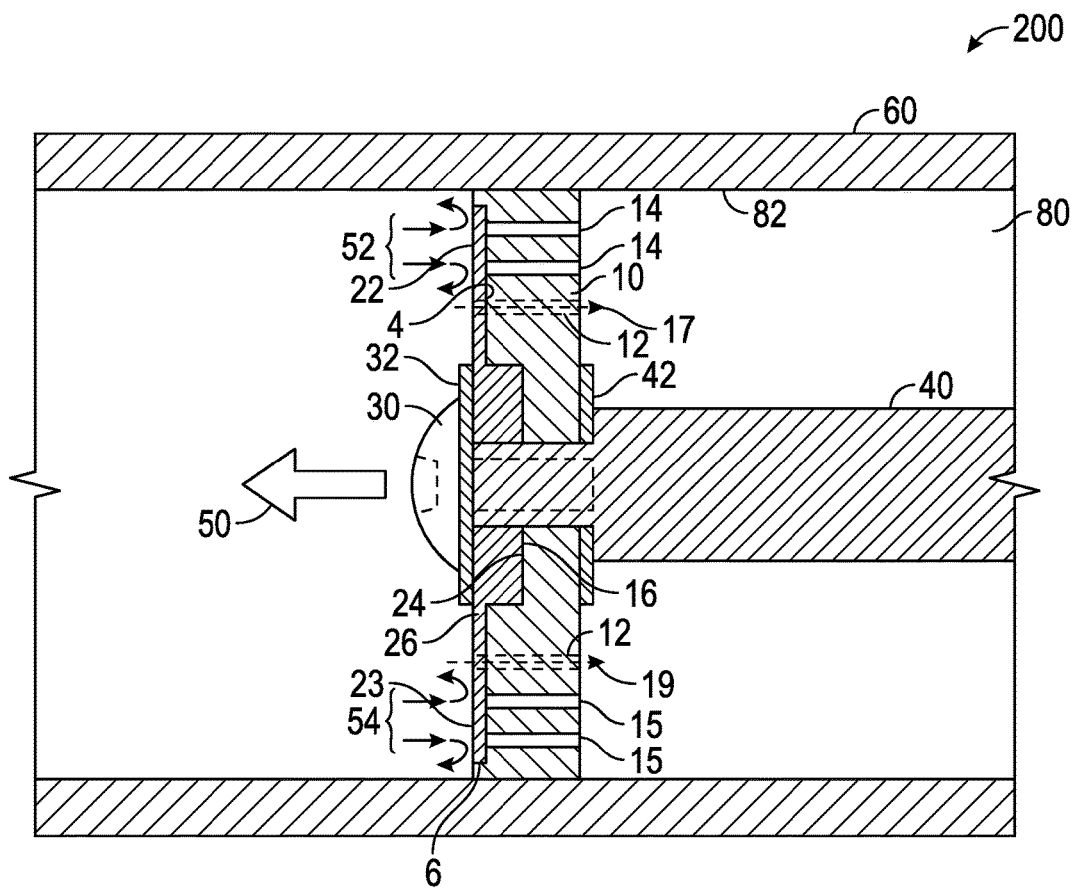
FIG. 2 is an elevational view, partially in section, of a piston head assembly in an R/C shock absorber during a compression stroke in accord with one possible non-limiting embodiment of the present invention.
Figure 3:
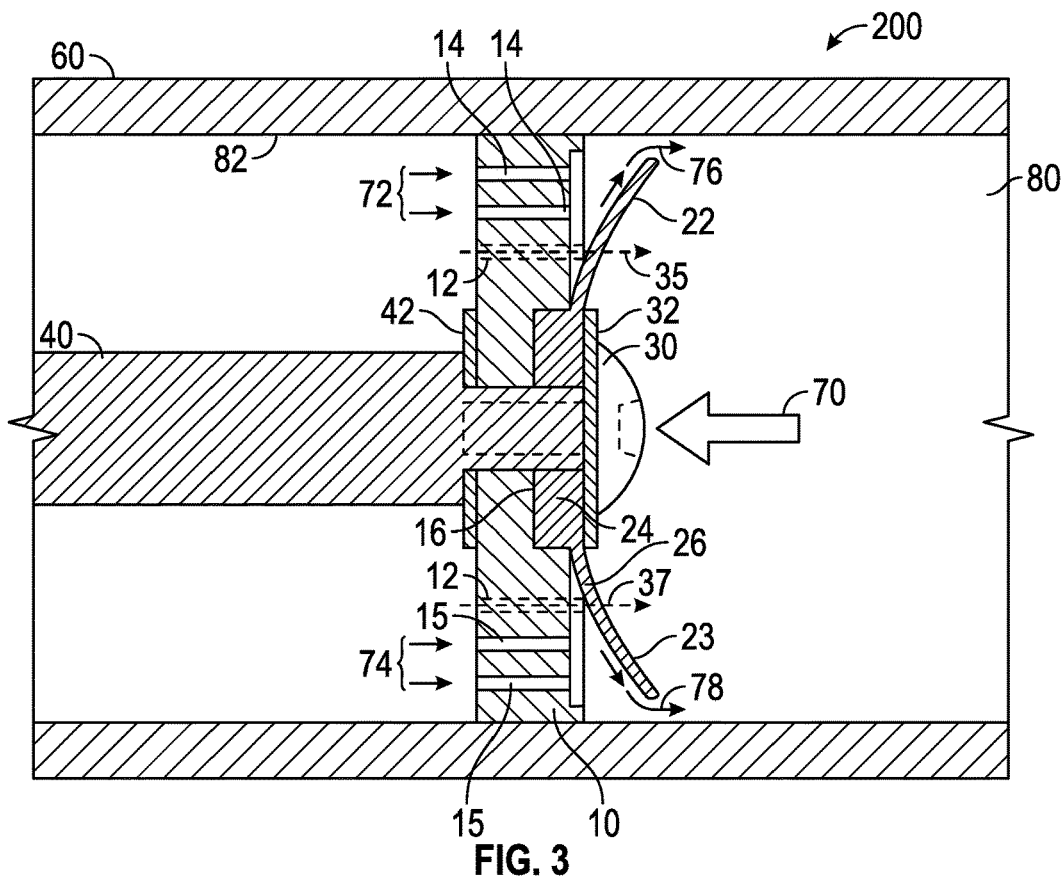
FIG. 3 is an elevational view, partially in section, of a piston head assembly in an R/C shock absorber during a rebound stroke in accord with one possible non-limiting embodiment of the present invention.

As shown in FIG. 2 and FIG. 3, piston head assembly 100 is used within piston cylinder 60 with the piston cylinder operably attached to a spring (not shown). The spring and shock absorber assembly will be situated so that when the R/C vehicle encounters a bump or other movement of the vehicle, the spring will compress and piston rod 40 will push piston 10 down through the fluid within piston cylinder 60 only allowing fluid through two way valve holes 12. This is called the compression stroke. Piston head 10 will then travel the opposite direction through piston cylinder 60 as the spring recoils to its normal operating position. This is called the rebound stroke. The movement of the shock absorber and spring is dependent on the force encountered by the suspension, and the damping force is selected to best keep the wheels on the ground during the suspension travel.

FIG. 2 is a partial sectional elevational view of piston head assembly 200 in an R/C shock absorber during the compression stroke in accord with the present invention. When an R/C car or vehicle encounters a bump or lands from a jump, for instance, the suspension reacts as depicted in FIG. 2. Piston rod 40 and piston head 10 travel within piston cylinder 60 as indicated by arrow 50. Piston head 10 has a round shape which engages cylinder wall 82, preventing fluid flow along the periphery of piston 10. In this embodiment, sealing member 26 fits within recess 18 completely so as to be flush with the surface of piston head 10. First one way valve member 22 engages first one way valve holes 14 to create a first one way valve and second one way valve member 23 engages second one way valve holes 15 to create a second one way valve. Fluid flows unimpeded through two way valve holes 12 as indicated by arrows 17 and 19. However, first one way valve holes 14 and second one way valve holes 15 are blocked by first valve member 22 and second valve member 23, thereby preventing fluid flow as indicated at arrows 52 and 54. Therefore, the resistance to movement of piston head 10 in direction of arrow 50 is greater than the resistance will be in the opposite direction as discussed hereinafter in FIG. 3.

As discussed herein, first and second one way valves 14 and 15 comprise two holes each, while in other embodiments, only one hole may be provided for first and second one way valves 14 and 15. In alternative embodiments, more than two holes may be provided for first and second one way valves 14 and 15. The number of holes provided for first and second one way valves 14 and 15 is dependent on the rebound damping force desired for the particular application.

The size and construction of first valve member 22 and second valve member 23 must be large enough to prevent being drawn into first valve holes 14 and second valve holes 15. The selected material and relative size of sealing member should be selected to be sufficiently flexible to move to open and close the one way valves in the oil typically used in RIC shock absorbers and at the speed of operation thereof.

Further, in a preferred embodiment the sealing members are preferably selected of material that is resilient to close the valve members when the piston head is not moving to provide that the one-way valve so formed is normally closed. Sealing member 26 is preferably comprised of materials not easily torn to be suitable to be able to withstand the shock and wear of normal operation to prevent disintegration inside piston cylinder 60. In one possible preferred embodiment, sealing member 26 could be constructed of a nitrile or neoprene rubber or other rubber or plastic materials. In a preferred embodiment, the material is selected to allow a range of operation at least at anticipated ambient temperatures.

FIG. 3 is a partial sectional elevational view of piston head assembly 200 in an R/C shock absorber during a rebound stroke in accord with one embodiment of the present invention. In this figure, piston head assembly 200 is in the rebound stroke, meaning that the piston is attempting to return to its normal or original position after encountering a bump, landing, or other event that caused the suspension to compress as depicted in FIG. 2, by dissipating the energy stored in the springs working in conjunction with the shock absorber. In one embodiment, sealing member 26 fits flush within recess 18 with key 24 engaged fully with key slots 16 to prevent rotational movement of sealing member 26 as described herein. In other embodiments, sealing member 26 rests on top of piston 10 with key 24 engaged fully with key slots 16 and would perform the same as described herein. Piston 10 and piston rod 40 are moving within piston cylinder 60 as indicated by arrow 70, opposite of the direction marked by arrow 50 shown in FIG. 2.

Fluid flows through two way valve holes 12 as indicated by arrows 35 and 37 just as described herein with regards to FIG. 2. However, in this embodiment first one way valve holes 14 and second one way valve holes 15 are not blocked by first valve member 22 and second valve member 23, because the fluid flow is in the opposite direction compared to FIG. 2. The flow of fluid 80 through first one way valve holes 14 and second one way valve holes 15 as indicated by arrows 72 and 74 disengages first valve member 22 from first valve holes 14, as well as second valve member 23 from second valve holes 15, which allows fluid 80 to flow through piston 10 as indicated by arrows 76 and 78. As discussed hereinbefore, first valve member 22 and first one way valve holes 14 act as a first one way valve, while second valve member 23 and second one way valve holes 15 act as a second one way valve for the rebound stroke. The first and second one way valves only allow fluid flow during the rebound stroke of the suspension. The increased flow of fluid 80 through piston 10 as indicated at arrows 76, 78, 35, and 37 provides a quicker return to normal operation for piston head assembly 200 as compared to traditional piston head assemblies to better maintain the wheel in contact with the road on the rebound stroke of the shock absorber.

Figure 4:
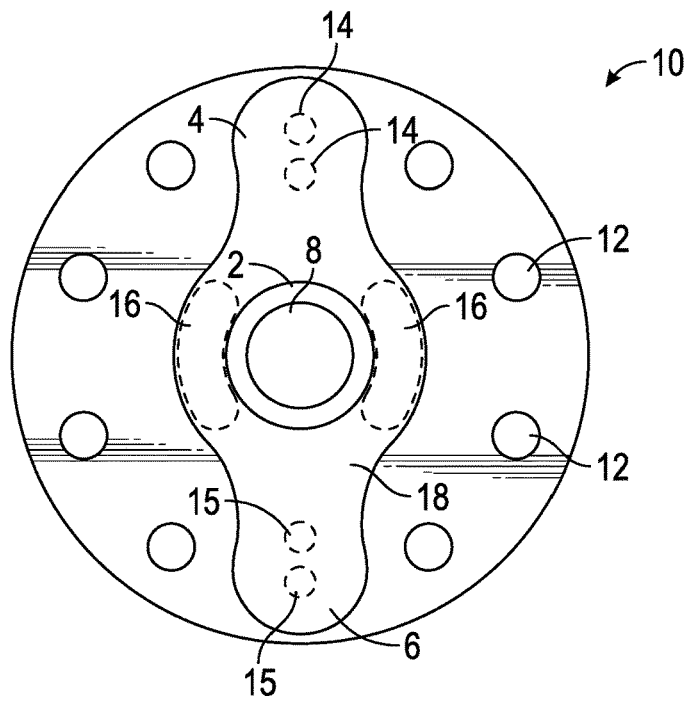
FIG. 4 is a top view of a piston head assembly for an R/C shock absorber in accord with one possible non-limiting embodiment of the present invention.

FIG. 4 is a top view of piston head assembly 10 for an R/C shock absorber in accord with one possible embodiment of the present invention. In a preferred embodiment, piston head 10 is comprised of a plastic or hard composite material. In one embodiment, piston head 10 has a diameter of less than one inch. In another embodiment, piston head 10 may have a diameter greater than one half inch, but less than one inch. In a preferred embodiment, the thickness of piston 10 is less than one-eighth of an inch. The thickness of piston head 10 is equal to or less than the thickness of the stock piston head assemblies provided with the R/C vehicles. Central portion 2 defines aperture 8 for connecting piston head 10 and sealing member 26 to piston rod 40 utilizing fastener 30. Key slots 16 curve around central portion 2 for receiving key 24 of sealing member 26, and in a preferred embodiment, key slots 16 curve around central portion 2 by an arc angle greater than sixty degrees. In other embodiments, piston head 10 may only comprise one key slot 16. In a preferred embodiment, the depth of key slots 16 is greater than the depth of recess 18, including first recess portion 4 and second recess portion 6. Piston head 10 further comprises a plurality of two-way valve holes 12 surrounding the periphery to allow fluid flow in both directions in response to reciprocating movement of piston head 10 within piston cylinder 60.

In a preferred embodiment, there are between no less than two and no more than eight of two way valve holes 12 present on piston head 10. The number of two way valve holes 12 depends on the R/C application for which piston head assembly 10 is sought, as different R/C vehicles have varying number of valves on the piston head. In this embodiment, first one way valve holes 14 and second one-way valve holes 15 may comprise two holes for each group. In another embodiment, first one way valve holes 14 and second one-way valve holes 15 may comprise only one hole. One way valve holes 14 and second one way valve holes 15 may comprise one hole each, or more than one hole. Both one way valve holes 14 and second one way valve holes 15 have a thickness less than piston head 10 as they are located within recess 18 which provides a shorter distance for oil to travel through the one way valves formed. In another embodiment, two way valve holes 12 may also have a thickness, or length, less than piston head 10.

As discussed hereinbefore, sealing member 26 is constructed of a nitrile or neoprene rubber in a preferred embodiment. The material selected for sealing member should be sufficiently flexible and resilient to both open and close the one way valves in the oil within the piston cylinder. Furthermore, in a preferred embodiment the sealing members are preferably selected of material suitable to withstand wear of normal operation to prevent disintegration inside piston cylinder 60.

In operation, when the suspension encounters a bump the pistons damp movement of the springs during compression. Once past the bump, the increased flow through pistons during the rebound stroke allows faster movement of the springs to improve the ability of the tires to stay in contact with the surface. The one way valves are simply constructed to be highly reliable and effective. In a preferred embodiment, the valve members, central portion, and keys are molded or otherwise constructed as one piece of the same material. The relative size of two-way valve holes and one-way valve holes depends on the types of fluid in the piston, the spring strength, size of the piston, and such factors, as can be adjusted by hobbyists. The piston head assembly of the present invention is robust. Tests utilizing the present invention have shown reliable improvement of lap speeds. The sealing member can be orientated by keys and/or by being secured within the recess in the head so that the valve members engage the one way valve holes. The piston head assembly of the present invention, if desired, can be sold utilizing standard sizes of piston heads without the need for different or specialized oil. Thus, the present invention is easily understood by users. If desired, sealing members with different durometers, flexibility, thickness, or the like, which factors affect the fluid flow, could be used by users to fine tune performance. The following embodiment operates as describe above but is simpler in construction.

Referring to FIGS. 5A and 5B, a top view is shown of one possible embodiment of piston head assembly 500 comprising piston head 510 and valve members 522 and 523, respectively, for an R/C shock absorber configured with a post 527 and corresponding openings 525 to hold the valve members in place on the surface of the piston head. Piston head assembly 500 comprises a plurality of two way valve holes 512 preferably evenly spaced apart along the circumference of piston head 510. In a preferred embodiment, four two way valve holes are positioned on opposite sides of aperture 508 and relative to each set of two way valve holes. Two-way valve holes 512 permit fluid flow in both directions through piston head 510. The one way valve holes may comprise a group of one way valve holes as shown in FIG. 5A where first one way valve holes 514 and second one-way valve holes 515 comprise two holes for each group. However, one hole or more than one hole could be utilized. The one-way valve holes may be smaller than the two-way valve holes if desired as shown in FIG. 5A. Valve members 522 and 523 interact with one-way valve holes 514 and 515 to form one way valves. Valve members 522 and 523 may be oriented by their position in a recess in the piston head and/or by posts 527 which are preferably wide enough to orient the valve members.

In alternative embodiments, more one way valves may be provided consistent with this disclosure to provide a desired rebound damping force. For example, additional valve members may extend sufficiently spaced from aperture 508 to engage with the corresponding additional sets of one way valve holes. Preferably, the valve members extend in a symmetrical way so that the forces produced by operation of the one-way valves do not cause tilting of piston head 510 during operation. For example, with three one-way valves, the valve members may be spaced sixty degrees apart. If four one-way valves are used, the valve members may be spaced apart by ninety degrees.

Similar to FIG. 2 and FIG. 3, first valve member 522 and second valve member 523 are resilient to engage one way valve holes 514 and 515 and close them off whereby first and second one way valve holes 514 and 515 are in the closed position preventing fluid flow when piston head 510 is not moving within piston cylinder 60. Accordingly in one embodiment as shown, two normally closed one-way valve members are created. As discussed herein, first and second one way valves 514 and 515 comprise two holes each, while in other embodiments, only one hole may be provided for first and second one way valves 514 and 515. In alternative embodiments, more than two holes may be provided for first and second one way valves 514 and 515. The number of holes provided for first and second one way valves 514 and 515 is dependent on the rebound damping force desired for the particular application.

In another embodiment valve members 522 and 523 may be provided in different thickness or flexibility to increase or decrease of rebound damping force desired without the need to change out the piston head.

In one embodiment, a dedicated washer such as washer 32 (see FIG. 1) may coordinate with posts 527 to hold the valve members 522 and 523 in place. The washer may extend radially to cover a sufficient portion of each respective valve member to securely retain the valve members in position and orientation against piston head 510. If desired, the washer may be larger to cover greater portions of the valve members 522 and 523 to reliably maintain the valve members in the correct orientation. Posts 527 may be sufficiently high to engage the washer or at least sufficiently high to hold valve members 523 and 522 in place.

While the valve members could be on the surface of piston head 510, in one preferred embodiment, valve members 522 and 523 are preferably positioned within recesses 519. The posts are then provided within the recesses as shown in FIG. 5A. The valve members 522 and 523 are preferably shaped such that each fits snuggly in recesses 519 to locate and position or orient the valves correctly so that each valve member may engage and disengage one way valve holes 514 and 515. The valve members may or may not extend outwardly radially to engage with cylinder wall 82. Recesses 519 may or may not extend to the walls. The thickness and/or resilience of the valve member will affect the response time of the valve so that thicker, less resilient, less flexible material of valve member reduces the fluid flow through the one way valves. In one embodiment, different thicknesses of valve members 522 and 523 may be provided to allow users to change the amount of rebound damping force as desired.

Additionally, valve members 522 and 523 comprise holes 525 sized with an axial length and width to accept a corresponding post 527. In this embodiment, the posts are located within the recess on the piston head 510. Posts 527 protrude from the surface of the piston or recesses 519 such that post 527 engages hole 525 to secure each respective valve member from becoming dislodged or moving laterally.

In one embodiment, valve members 522 and 523 have a shape that corresponds with the shape of recesses 519. The thickness of valve members can be varied depending on the desired rebound damping force. In a preferred embodiment, recesses 519 are completely flat surfaces of a desired depth that encloses valve members 522 and 523. In other words, separate valve members 522 and 523 are contained within the recess below the surface of piston head 510, substantially flush with the surface of piston head 510 or slightly above or below the surface of piston head 510. In one preferred embodiment recesses 519 are approximately of equal depth as shown in FIG. 1 with the valve members flush at or near the surface or below the surface. However, as discussed previously, the valve members may be provided in different thicknesses and/or different flexibility to allow the users to change the rebound effect. and operate in a similar manner as previously described. In a preferred embodiment, the valve members operate as described hereinbefore.

In one preferred embodiment, key slots 517 are simply regions of recesses 519 adjacent the posts and are flat as described earlier with corresponding flat valve members 522 and 523. In this embodiment, additional depth or thickness of the key slots and keys as shown in FIG. 1 key slot 24 is not provided but could be if desired. In other words, in one embodiment the entirety of recesses 519 and the corresponding surface of valve members 522 and 523 that engage the surface of recesses 519 is flat. In that case, valve members 522 are preferably flat on both sides. In this case, key 524 engaged fully with key slots 517 to prevent rotational movement of valve members 522 and 523 as described herein.

In other embodiments, valve members 522 and 523 may rest on top of piston 510. The width of posts 527 then holds them in alignment with openings 514 and 515.

When recesses are utilized, keys 524 and key slots 517 may be of numerous different configurations to thereby orient the valve members correctly with respect to the one-way valve holes. However, keys 524 and key slots 517 may be flat and part of recess 519 that may have a uniform flat surface. Keys 524 and key slots 517 may also have additional depth as shown by key 24 in FIG. 1 or may extend radially outwardly from the outline of recesses 519 so that recesses 519 may comprise notches rather than straight interior surfaces 521.

Valve members 522 and 523 may be flat and may be stamped or cut out but could be molded if keys with depth are used. The interior surfaces 521 of recesses 519 act to secure the valve members that are shaped the same as the recesses. In one embodiment, key slots 517 are simply regions of recess 519 that are shaped to receive corresponding keys 524 which may be flat. However, valve members 523 and 522 may be constructed in different ways.

It will be appreciated that significant forces are created during operation with the oil in the piston so that the size and shape of posts 527 may vary. In this embodiment, posts 527 are sufficiently wide but relatively short in radial length to allow significant flexibility of valve members 522 and 523 while maintaining good control or orientation along with the help of recess 519. In one embodiment, the radial thickness of posts 527 is in a range of 5% to 20% of the overall radial length of recesses 519. The width of posts 527 holds valve members 522 and 523 in position but also in orientation so that the valve members are aligned with one-way valve holes 514 and 515. The width of posts 527 may be 40% to 90% of the width of valve members 522 and 523 or any specific value or range therebetween such as 65% to 85% or 70%. In one embodiment, the width is the length perpendicular to the radial length. Recesses and valve members may be substantially rectangular shaped.

In another embodiment two or more paced apart but smaller posts could be used to secure each valve member and orient the valve member. By using two or more posts, the orientation can be achieved because multiple posts extending through corresponding holes in the valve members sets a particular orientation.

In general overview of the drawings, it will be understood that such terms as "up," "down," "vertical," and the like, are made with reference to the drawings and/or the earth and that the devices may not be arranged in such positions at all times depending on variations in operation, transportation, mounting, and the like. As well, the drawings are intended to describe the concepts of the invention so that the presently preferred embodiments of the invention will be plainly disclosed to one of skill in the art but are not intended to be manufacturing level drawings or renditions of final products and may include highly simplified conceptual views and exaggerated angles, sizes, and the like, as desired for easier and quicker understanding or explanation of the invention. One of skill in the art upon reviewing this specification will understand that the relative size, orientation, angular connection, and shape of the components may be greatly different from that shown to provide illuminating instruction in accord with the novel principals taught herein. As well, connectors, component shapes, and the like, between various housings and the like may be oriented or shaped differently or be of different types as desired. Many additional changes in the details, components, steps, and organization of the system and method, herein described and illustrated to explain the nature of the invention, may be made by those skilled in the art within the principle and scope of the invention. It is therefore understood that within the scope of the appended claims, the invention may be practiced otherwise than as specifically described.

What is claimed is:

1. An R/C piston head assembly for an R/C shock absorber, said R/C shock absorber comprising a piston rod, a piston cylinder, and fluid within said piston cylinder, said R/C piston head assembly comprising:
   an R/C piston head with a round periphery and defining a plurality of two-way holes therein that permit two-way fluid flow through said R/C piston head when said R/C piston head reciprocates in said piston cylinder, said R/C piston head further defining at least a first valve hole and second valve hole in said R/C piston head;

at least two separate valve members comprising a first valve member and a second valve member, said first valve member and second valve member extending radially outwardly from and spaced from a central portion of said R/C piston head;

said first valve member and second valve member being supported on said R/C piston head so that said first valve member engages said first valve hole and said second valve member engages said second valve hole to thereby form first and second one-way fluid flow valves in said R/C piston head, said first valve member and said second valve member being flexible to open and close said first and second one-way fluid flow valves in response to reciprocating movement of said R/C piston head in said piston cylinder, said first valve member and said second valve member being resilient to engage and close said first and second one-way fluid flow valves when said R/C piston head is not moving in said piston cylinder; and at least two posts positioned on said R/C piston head wherein said at least two posts protrude from said R/C piston head to engage corresponding holes within said at least two separate valve members to connect and orient said at least two separate valve members to said R/C piston head.

2. The RIC piston head assembly of claim 1, wherein said at least two separate valve members being comprised of flexible material, said fluid being a liquid.

3. The R/C piston head assembly of claim 1, wherein said at least two separate valve members fit within at least two separate recesses, said at least two posts comprising a post in each of said at least two separate recesses.

4. The R/C piston head assembly of claim 3, each post comprising a radial length smaller than a width of each post, wherein said width of each post being at least 40% of a width of each valve member.

5. The R/C piston head assembly of claim 3 wherein said at least two separate valve members are oriented to said first valve hole and said second valve hole by said at least two posts and said at least two separate recesses.

6. The R/C piston head assembly of claim 1 wherein said R/C piston head defining a recess comprising a plurality of key slots, a plurality of keys on said at least two separate valve members that are engageable with said key slots.

7. The R/C piston head assembly of claim 1 wherein said at least first and second valve holes in said R/C piston head comprise first and second groups of valve holes, said first valve member engaging said first group of valve holes and said second valve member engaging said second group of valve holes.

8. A method for making or using an R/C piston head assembly for an R/C shock absorber, said R/C shock absorber comprising a piston rod, a piston cylinder, and fluid within said piston cylinder, said method comprising:

providing a R/C piston head comprising a round periphery and defining a plurality of two-way holes therein that permit two-way fluid flow through said R/C piston head when said R/C piston head reciprocates in said piston cylinder, said R/C piston head further defining a first valve hole and a second valve hole in said R/C piston head;

providing at least two separate valves members comprising a first and a second valve member, said first and second valve members extending radially outwardly and spaced from a central portion aperture in said R/C piston head;

providing a first post and a second post on said R/C piston head; and providing that said first and second valve members comprise openings to receive said first post and said second post respectively to orient said first valve member to engage said first valve hole and said second valve member to engage said second valve hole to thereby form first and second one-way valves in said R/C piston head, said first valve member and said second valve member being flexible to open and close said first and second one-way valves in response to reciprocating movement of said R/C piston head in said piston cylinder.

9. The method of claim 8, further providing said at least first and second valve members are resilient to engage and close said first and second one-way valves when said R/C piston head is not moving in said piston cylinder, said fluid being a liquid.

10. The method of claim 8, further providing that said at least two separate valve members are positioned within at least two recesses formed in said R/C piston head and that said first post and said second post are formed in said at least two recesses.

11. The method of claim 10, further providing said first post and said second post each comprise a radial post length shorter than a post width.

12. The method of claim 11, further comprising said post width is at least 40% of a valve member width.

13. The method of claim 8, comprising providing said R/C piston head defines a centrally positioned hole for connection to said piston rod and that at least two recesses are formed on said R/C piston head on an opposite sides from said piston rod.

14. The method of claim 8, further comprising providing said at least first and second valve holes in said R/C piston head comprise first and second groups of valve holes, said first valve member engaging said first group of valve holes and said second valve member engaging said second group of valve holes.

15. The method of claim 8, further comprising said R/C piston head defining a recess comprising a plurality of key slots, a plurality of keys on said at least two separate valve members that are engageable with said key slots.

* * * * *